(12) United States Patent  
Amirparviz et al.

(10) Patent No.: US 8,823,740 B1  
(45) Date of Patent: Sep. 2, 2014

(54) DISPLAY SYSTEM

(75) Inventors: Babak Amirparviz, Mountain View, CA (US); Xiaoyu Miao, Sunnyvale, CA (US); Adrian Wong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 336 days.

(21) Appl. No.: 13/209,706

(22) Filed: Aug. 15, 2011

(51) Int. Cl.
*G09G 5/00* (2006.01)

(52) U.S. Cl.
USPC ........................................................ 345/633

(58) Field of Classification Search
CPC ...... A61B 3/032; A61B 3/1225; G02C 11/00; G02C 11/10; G06F 3/011; G06F 3/012; G06K 9/00335; G06K 9/2036; G06T 19/006; G06T 19/00; G02B 27/017
See application file for complete search history.

(56) References Cited

U.S. PATENT DOCUMENTS

| | | | |
|---|---|---|---|
| 5,293,535 A | 3/1994 | Sensui | |
| 5,526,184 A | 6/1996 | Tokuhashi et al. | |
| 5,715,337 A | 2/1998 | Spitzer et al. | |
| 5,886,822 A | 3/1999 | Spitzer | |
| 5,943,171 A | 8/1999 | Budd et al. | |
| 5,949,583 A | 9/1999 | Rallison et al. | |
| 6,023,372 A | 2/2000 | Spitzer et al. | |
| 6,091,546 A | 7/2000 | Spitzer | |
| 6,201,629 B1 | 3/2001 | McClelland et al. | |
| 6,204,974 B1 | 3/2001 | Spitzer | |
| 6,349,001 B1 | 2/2002 | Spitzer | |
| 6,353,492 B2 | 3/2002 | McClelland et al. | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,394,602 B1 * | 5/2002 | Morrison et al. | ............. 351/206 |
| 6,538,799 B2 | 3/2003 | McClelland et al. | |
| 6,618,099 B1 | 9/2003 | Spitzer | |
| 6,671,100 B1 | 12/2003 | McRuer | |
| 6,693,749 B2 | 2/2004 | King et al. | |

(Continued)

FOREIGN PATENT DOCUMENTS

| | | |
|---|---|---|
| WO | 0233688 A2 | 4/2002 |
| WO | 2010054473 A1 | 5/2010 |

OTHER PUBLICATIONS

Falldorf et al., Liquid Crystal Spatial Light Modulators in Optical Metrology, 2010, 987-1-4244-8227-6/10, IEEE, pp. 1-3.*

(Continued)

*Primary Examiner* — Kee M Tung
*Assistant Examiner* — Frank Chen
(74) *Attorney, Agent, or Firm* — McDonnell Boehnen Hulbert & Berghoff LLP (57) ABSTRACT

A display system includes an image generator configured to generate a virtual image and a first beam splitter coupled to the image generator. The virtual image and a real-world view are viewable through the first beam splitter from a viewing location. The display system also includes a second beam splitter coupled to the first beam splitter and a camera coupled to the second beam splitter. The camera is configured to image an eye of a user located at the viewing location. Further, a controller is coupled to the image generator and the camera. The controller is configured to process the image of the eye of the user, to determine a location in at least one of the real-world view and the virtual image where the eye of the user is focused, and to control an operation of the display system in response to the determined location.

25 Claims, 3 Drawing Sheets

(56) References Cited

U.S. PATENT DOCUMENTS

| | | | |
|---|---|---|---|
| 6,701,038 B2 | 3/2004 | Rensing et al. | |
| 6,724,354 B1 | 4/2004 | Spitzer | |
| 6,862,006 B2 | 3/2005 | Sato et al. | |
| 6,879,443 B2 | 4/2005 | Spitzer et al. | |
| 7,158,096 B1 | 1/2007 | Spitzer | |
| 7,192,136 B2 | 3/2007 | Howell et al. | |
| 7,242,527 B2 * | 7/2007 | Spitzer et al. | 359/630 |
| 7,255,437 B2 | 8/2007 | Howell et al. | |
| 7,369,317 B2 * | 5/2008 | Li et al. | 359/630 |
| 7,380,936 B2 | 6/2008 | Howell et al. | |
| 7,401,918 B2 | 7/2008 | Howell et al. | |
| 7,438,410 B1 | 10/2008 | Howell et al. | |
| 7,457,040 B2 | 11/2008 | Amitai | |
| 7,481,531 B2 | 1/2009 | Howell et al. | |
| 7,500,746 B1 | 3/2009 | Howell et al. | |
| 7,500,747 B2 | 3/2009 | Howell et al. | |
| 7,522,344 B1 | 4/2009 | Curatu et al. | |
| 7,543,934 B2 | 6/2009 | Howell et al. | |
| 7,581,833 B2 | 9/2009 | Howell et al. | |
| 7,621,634 B2 | 11/2009 | Howell et al. | |
| 7,663,805 B2 | 2/2010 | Zaloum et al. | |
| 7,672,055 B2 | 3/2010 | Amitai | |
| 7,677,723 B2 | 3/2010 | Howell et al. | |
| 7,724,443 B2 | 5/2010 | Amitari | |
| 7,751,122 B2 | 7/2010 | Amitai | |
| 7,760,898 B2 | 7/2010 | Howell et al. | |
| 7,771,046 B2 | 8/2010 | Howell et al. | |
| 7,792,552 B2 | 9/2010 | Thomas et al. | |
| 7,806,525 B2 | 10/2010 | Howell et al. | |
| 7,843,403 B2 | 11/2010 | Spitzer | |
| 7,900,068 B2 | 3/2011 | Weststrate et al. | |
| 7,922,321 B2 | 4/2011 | Howell et al. | |
| 8,004,765 B2 | 8/2011 | Amitai | |
| 8,109,629 B2 | 2/2012 | Howell et al. | |
| 8,270,086 B1 * | 9/2012 | Hall et al. | 359/629 |
| 8,335,040 B2 * | 12/2012 | Mukawa et al. | 359/630 |
| 2003/0090439 A1 | 5/2003 | Spitzer et al. | |
| 2005/0174651 A1 | 8/2005 | Spitzer et al. | |
| 2006/0192306 A1 | 8/2006 | Giller et al. | |
| 2006/0192307 A1 | 8/2006 | Giller et al. | |
| 2006/0238877 A1 | 10/2006 | Ashkenazi et al. | |
| 2008/0219025 A1 | 9/2008 | Spitzer et al. | |
| 2009/0122414 A1 | 5/2009 | Amitari | |
| 2009/0231687 A1 | 9/2009 | Yamamoto | |
| 2010/0046070 A1 | 2/2010 | Mukawa | |
| 2010/0103078 A1 | 4/2010 | Mukawa et al. | |
| 2010/0149073 A1 | 6/2010 | Chaum et al. | |
| 2010/0278480 A1 | 11/2010 | Vasylyev | |
| 2011/0018903 A1 | 1/2011 | Lapstun et al. | |
| 2011/0109528 A1 | 5/2011 | Mun et al. | |
| 2011/0227820 A1 | 9/2011 | Haddick et al. | |
| 2012/0293548 A1 * | 11/2012 | Perez et al. | 345/633 |

OTHER PUBLICATIONS

Cakmakci, Ozan et al., "Head-Worn Displays: A Review," Journal of Display Technology, vol. 2, pp. 199-216, 2006.

Levola, Tapani, "Diffractive Optics for Virtual Reality Displays", Academic Dissertation, Joensuu 2005, University of Joensuu, Department of Physics, Vaisala Laboratory, 26 pages.

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

Pfeiffer, Thies, "Towards Gaze Interaction in Immersive Virtual Reality: Evaluation of a Monocular Eye Tracking Set-UP", AI Group, Faculty of Technology, Bielefeld University, Sep. 2008, 12 pages.

Scholles, Michael et al., "OLED-on-CMOS for sensors and microdisplays", Fraunhofer Institute for Photonic Microsystems (IPMS), May 2010, 20 pages.

* cited by examiner

DISPLAY SYSTEM

BACKGROUND

Wearable systems can integrate various elements, such as miniaturized computers, input devices, sensors, image displays, wireless communication devices, and image and audio processors, into a device that can be worn by a user. Such systems can provide a mobile and lightweight solution to communicating, computing, and interacting with a user's environment. With the advance of technologies associated with wearable systems and miniaturized optical elements, it has become possible to consider wearable compact optical display systems that augment the user's experience of a real-world environment.

In one example, by placing an image display element or component close to the user's eye(s), an artificial or virtual computer-generated image can be displayed over the user's view of the real-world environment. One or more such image display elements can be incorporated into optical display systems and referred to generally as near-eye displays, head-mounted displays ("HMDs"), or heads-up displays ("HUDs"). Depending upon the size of the display element and the distance to the user's eye, the artificial image may fill or nearly fill the user's field of view.

SUMMARY

In a first aspect, a display system includes an image generator configured to generate a virtual image and a first beam splitter coupled to the image generator. The virtual image and a real-world view are viewable through the first beam splitter from a viewing location. The display system also includes a second beam splitter coupled to the first beam splitter and a camera coupled to the second beam splitter. The camera is configured to image the viewing location. Further, a controller is coupled to the image generator and the camera. The controller is configured to control an operation of the display system based on the image of the viewing location.

In a second aspect, a display system includes a display panel configured to generate a light pattern. One or more optical components are coupled to the display panel. The one or more optical components are configured to transmit the light pattern, external light from a real-world environment, and reflected light from a viewing location. Further, the light pattern is viewable from the viewing location through the one or more optical components as a virtual image superimposed over the real-world environment. The display system also includes an optical sensor coupled to the one or more optical components and configured to receive the external light to obtain an image of the real-world environment and to receive the reflected light to obtain an image of the viewing location. A processor is coupled to the display panel and the optical sensor and is configured to process the image of the real-world environment and the image of the viewing location.

In a third aspect, a method includes generating a light pattern using a display panel and forming a computer generated image from the light pattern utilizing one or more optical components. The computer generated image is viewable from a viewing location. The method also includes receiving external light from a real-world environment through the one or more optical components and incident on an optical sensor. The real-world environment is viewable from the viewing location. In addition, the method includes obtaining an image of the real-world environment from the received external light, receiving light reflected from the viewing location and incident on the optical sensor, and obtaining an image of the viewing location location from the received reflected light. Further, the method includes controlling the generation of the light pattern based on the image of the viewing location.

DETAILED DESCRIPTION

The present disclosure generally relates to an optical display system that enables a user to observe the user's real-world surroundings or environment and to view a computer-generated virtual image. In some cases, the virtual image overlays a portion of the user's field of view of the real world.

In accordance with one example, the display system of the present disclosure includes a see-through wearable computer system, such as an HMD that displays a computer-generated virtual image that may be overlaid over a portion of the user's field of view of the real-world environment or surroundings. Thus, while the user of the HMD is going about his or her daily activities, such as walking, driving, exercising, etc., the user may be able to see a displayed image generated by the HMD at the same time that the user is looking out at his or her real-world surroundings.

The virtual image may include, for example, graphics, text, and/or video that provide content, such as data, alerts, or indications relating to the user's real-world environment. The content of the virtual image can relate to any number of contexts, including, but not limited to, the user's current environment, an activity in which the user is currently engaged, a biometric status of the user, and any audio, video, or textual communications that have been directed to the user. The virtual image may also be part of an interactive user interface and include menus, selection boxes, navigation icons, or other user interface features that enable the user to interact with the display system and other devices.

The virtual image can be updated or modified dynamically in response to a change in the context, such as a change in the user's real-world field of view, a change in the user's current activity, a received communication, a preset alarm or reminder, an interaction with a user interface or menu, etc. In one example of the present disclosure, the virtual image can be changed or modified in response to gaze tracking of the user. More particularly, in the present example, the display system is configured to track the gaze of the user and to identify one or more locations in the user's real-world view or in the virtual image where a user's eye is focused. Based on such identified location(s), the virtual image can be modified to relate to a feature in the real-world view or to some portion of the virtual image.

Figure 1:
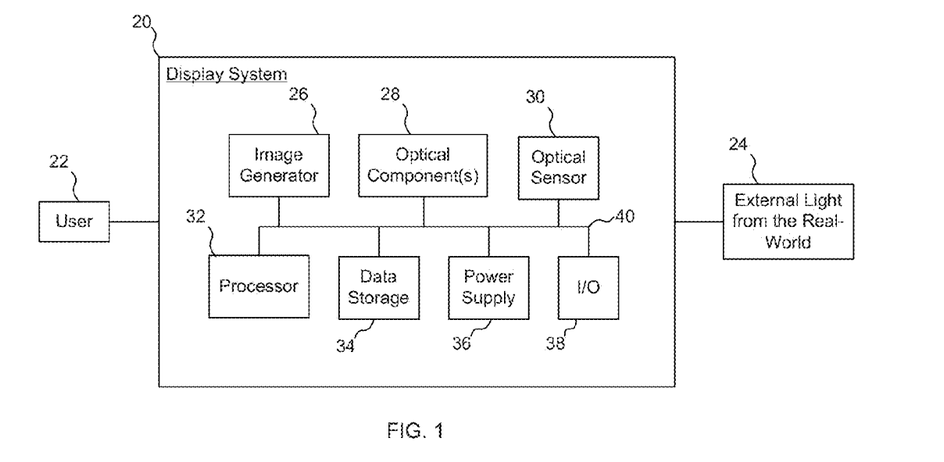
FIG. 1 is a block diagram of a display system in accordance with an example embodiment.

Referring now to FIG. 1, a display system 20 in accordance with an example embodiment enables a user 22 to observe a real-world environment and to view a computer-generated virtual image. In FIG. 1, the user's view of the real-world environment is observed by receiving external light 24 from the real world. The illustrated display system 20 includes an image generator 26, one or more optical components 28, an optical sensor 30, a processor 32, data storage 34, a power supply 36, and other input/output ("I/O") components 38. The various components 26-38 of the display system 20 of FIG. 1 are operatively coupled together by a connection 40, which can represent any number of wired or wireless electrical connections and/or direct or indirect physical or optical couplings, for example.

Generally, the processor 32 controls the image generator 26 to generate a light pattern that is directed through the optical component(s) 28 to form the virtual image that is viewable by the user 22. In addition, the processor 32 and the optical sensor 30 are configured to obtain a representation of the real-world environment and to track the gaze of the user 22. In response to the gaze tracking, the processor 32 is further configured to control the light pattern generated by the image generator 26 to update or modify the virtual image viewable by the user 22. The virtual image may be updated or modified in response to the gaze tracking by changing the location, size, brightness, content, and/or other properties thereof.

For example, in response to the processor 32 determining that a user's eye is focused on a sign on a sidewalk for a particular bus route, the virtual image can be modified to provide additional information for the bus route, such as an estimated time of arrival for the next bus, an estimated travel time to arrive at a predetermined destination if riding the bus, a required fare for the bus, etc. In another example, in response to the processor 32 determining that the user's eye is focused on an icon in the virtual image that indicates a new email or text message has been received, the virtual image can be modified to display the email or text message.

In the present example, the data storage 34 can be any suitable device or computer readable medium that is capable of storing data and instructions that can be executed by the processor 32 to control the image generator 26, to obtain the representation of the real-world environment, to track the gaze of the user 22, and to control other components of the display system 20. The power supply 36 provides electrical power to the various components of the display system 20 and can be any suitable rechargeable or non-rechargeable power supply. Further the I/O components 38 may include switches, dials, buttons, touch screens, etc. that allow the user 22 to interact with the display system 20. The I/O components 38 may also include, for example, speakers, microphones, biometric sensors, environmental sensors, and transmitters and/or receivers for communicating with other devices, servers, networks, and the like.

Further, the processor 32 can also be configured to control other components of the display system 20 in response to the gaze tracking. For example, in response to the processor 32 identifying that the user's eye(s) are focused on an icon in the virtual image that indicates a voicemail has been received, the I/O components 38 may be controlled to play the voicemail to the user through a speaker. In another example, in response to the processor 32 identifying that the user's eye(s) are focused on an icon in the virtual image to return a missed call, the I/O components 38 may be controlled to initiate a call to the missed call phone number.

Figure 2:
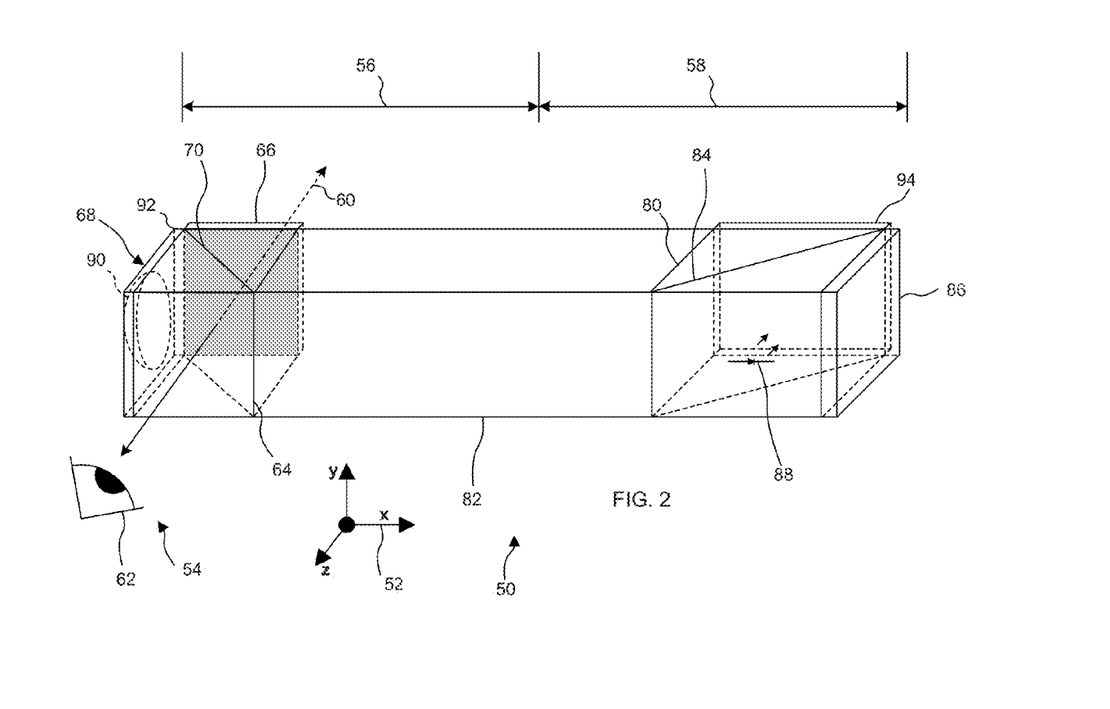
FIG. 2 is an isometric schematic view of an optical system in accordance with an example embodiment.

FIG. 2 shows an isometric schematic view of an optical system 50 in accordance with an example embodiment. For purposes of illustration, the optical system 50 is described with reference to an XYZ coordinate system 52 and in relation to a viewing location 54. The optical system 50 generally includes a first proximal portion 56 and a second distal portion 58. In typical operation, the proximal portion 56 is disposed adjacent the viewing location 54 and defines a viewing axis 60 therethrough. An object 62, such as an eye of a user or a camera or other optical sensor, can be positioned generally at the viewing location 54 to view a real-world environment and a computer-generated virtual image. The real-world environment and the virtual image can be viewable simultaneously. For example, the virtual image may overlay a portion of the user's view of the real-world environment.

In FIG. 2, the distal portion 58 extends generally horizontally along the x-axis from the proximal portion 56 such that the distal portion is to the right of the proximal portion from the perspective of the viewing location 54. However, other configurations are possible, for example, the distal portion 58 can be to the left of the proximal portion 56, the optical system 50 can extend vertically with the distal portion located above or below the proximal portion, or the distal portion can extend in any other direction from the proximal portion.

In the illustrated optical system 50, the proximal portion 56 includes a proximal beam splitter 64 that has faces generally parallel to XY, XZ, and YZ planes. In FIG. 2, a viewing window 66 is coupled to a front side of the proximal beam splitter 64 and allows external light into the proximal beam splitter. The viewing axis 60 is defined through the proximal beam splitter 64 and the viewing window 66 and is directed substantially parallel to the z-axis. Generally, in use, the viewing location 54 and the eye of the user 62 are positioned at a back side of the proximal beam splitter 64 so that the user can view the real world through the viewing window 66 and the proximal beam splitter along the viewing axis 60. In the present example, the optical system 50 further includes an image former 68 optically coupled to the proximal beam splitter 64. In one example, the image former 68 is configured to reflect light corresponding to the virtual image in the direction of the x-axis.

The proximal beam splitter 64 of FIG. 2 includes a proximal beam-splitting interface 70 that is configured to combine the external light entering the proximal beam splitter through the viewing window 66 with the light that represents the virtual image generated by the optical system 50 so that the real-world environment and the virtual image can be viewed along the viewing axis 60. In one example, the proximal beam-splitting interface 70 is in a plane that forms about 45-degree angles with the faces of the proximal beam splitter 64 that are in the XY-plane and YZ-plane and is perpendicular to the faces in the XZ-plane. As a result, the proximal beam-splitting interface 70 intersects the viewing axis 60 at about 45 degrees. It is to be understood, however, that other angles and configurations are possible.

As seen in FIG. 2, the distal portion 58 of the optical system 50 includes a distal beam splitter 80 that has faces generally parallel to XY, XZ, and YZ planes. The distal beam splitter 80 is, in turn, optically coupled to the proximal beam splitter 64 by a light pipe 82, for example. The distal beam splitter 80 includes a distal beam-splitting interface 84 that is generally configured to transmit and reflect light to and from the proximal beam splitter 64 through the light pipe 82. Such transmitted and reflected light can be utilized to generate the virtual image and for gaze tracking. In one example, the distal beam-splitting interface 84 is a plane that forms an angle with the faces of the distal beam splitter 80 that are in the XY-plane and YZ-plane and is perpendicular to the faces in the XZ-plane. The distal beam-splitting interface 84 is arranged at a non-zero angle with respect to the proximal beam-splitting interface 70. In one example, the distal beam-splitting interface 84 is generally orthogonal to the proximal beam-splitting interface 70. It is to be understood, however, that the orientation of the distal beam-splitting interface 84 may be modified in other examples. For example, the distal beam-splitting interface 84 can be in a plane that is parallel to the proximal beam-splitting interface 70 or parallel to the viewing axis.

In one embodiment, the proximal beam splitter 64, the distal beam splitter 80, and the light pipe 82 are made of glass. Alternatively, some or all of such optical components may be made partially or entirely of plastic, which can also function to reduce the weight of optical system 50. A suitable plastic material is Zeonex® E48R cyclo olefin optical grade polymer, which is available from Zeon Chemicals L.P., Louisville, Ky. Another suitable plastic material is polymethyl methacrylate ("PMMA").

The distal portion 58 further includes a display panel 86 and a light source 88 optically coupled to the distal beam splitter 80. In the present example, the display panel 86 is generally vertically oriented and coupled to a right side of the distal beam splitter 80 and the light source 88 is coupled to a back side of the distal beam splitter.

The display panel 86 is configured to generate a light pattern from which the virtual image is formed. The display panel 86 may be an emissive display such as an Organic Light Emitting Diode ("OLED") display. Alternatively, the display panel 86 may be a Liquid-Crystal on Silicon ("LCOS") or a micro-mirror display such as a Digital Light Projector ("DLP") that generates the light pattern by spatially modulating light from a light source, such as the light source 88. The light source 88 may include, for example, one or more light-emitting diodes ("LEDs") and/or laser diodes. The light pattern generated by the display panel 86 can be monochromatic or may include multiple colors, such as red, green, and blue, to provide a color gamut for the virtual image.

In one example of the optical system 50 in use, the light source 88 emits light toward the distal beam-splitting interface 84, which reflects the light toward the display panel 86. The display panel 86 generates a light pattern by spatially modulating the incident light to provide spatially modulated light reflected toward the distal beam-splitting interface 84. The distal beam-splitting interface 84 transmits the spatially modulated light through the light pipe 82 and toward the proximal beam splitter 64. The proximal beam-splitting interface 70 transmits the spatially-modulated light so that it reaches the image former 68. The image former 68 reflects the spatially-modulated light back toward the proximal beam-splitting interface 70, which reflects the spatially-modulated light toward the viewing location 54 so that the virtual image is viewable along the viewing axis 60.

As a general matter, the reflection and/or transmission of light by and/or through the beam splitters 64, 80 or other optical components of the optical system 50 may refer to the reflection and/or transmission of substantially all of the light or of a portion of the light. Consequently, such terms and descriptions should be interpreted broadly in the present disclosure.

In some embodiments, the proximal and/or distal beam splitters 64, 80 may be polarizing beam splitters, such that the beam splitters preferentially transmit p-polarized light and preferentially reflect s-polarized light, for example. More particularly, in one embodiment, the proximal beam splitter 64 is a polarizing beam splitter that preferentially transmits p-polarized light and preferentially reflects s-polarized light. With this configuration, the external light that is viewable along the viewing axis 60 is generally p-polarized and the light that is viewable along the viewing axis as the virtual image is generally s-polarized. In the present example, the distal beam splitter 80 may be a non-polarizing beam splitter that transmits a portion of the incident light and reflects a portion of the incident light independent (or largely independent) of polarization. The light source 88 may provide s-polarized light that is partly reflected by the distal beam-splitting interface 84 toward the display panel 86. The display panel 86 spatially modulates the incident s-polarized light and also changes its polarization. Thus, in this example, the display panel 86 converts the incident s-polarized light into a spatially-modulated light pattern of p-polarized light. At least a portion of the p-polarized light is transmitted through the distal beam-splitting interface 84, through the light pipe 82, and through the polarizing proximal beam-splitting interface 70 to the image former 68.

In the present example, the image former 68 includes a reflector 90, such as a concave mirror or Fresnel reflector, and a quarter-wave plate 92. The p-polarized light passes through the quarter-wave plate 92 and is reflected by the reflector 90 back through the quarter-wave plate toward the proximal beam-splitting interface 70. After the light pattern interacts with the image former 68 in this way, the polarization is changed from p-polarization to s-polarization and the s-polarized, spatially-modulated light is reflected by the proximal beam-splitting interface 70 toward the viewing location 54 so that the virtual image is viewable along the viewing axis 60.

Referring back to FIG. 2, the optical system 50 further includes an optical sensor 94 that is optically coupled to the distal beam splitter 80. In FIG. 2, the optical sensor 94 is generally vertically oriented and coupled to a front side of the distal beam splitter 80. The optical sensor 94 can be a camera, such as a wafer-level camera, an infrared ("IR") camera, a CCD image sensor, a CMOS sensor, and the like, with an image sensing portion of the optical sensor directed towards or facing the distal beam splitter 80. The optical sensor 94 is configured to image the external light entering through the viewing window 66 and viewable by the user along the viewing axis 60 and to image an object 62, such as the user's eye, at the viewing location 54. The optical sensor 94 may be configured to capture still images and/or video. The still images and/or video captured by the optical sensor 94 may substantially correspond to the view of the real world that the user sees when looking through the viewing window 66 and may be processed with the image of the user's eye 62 to determine where in the real world the user is looking. Further, the virtual image viewed by the user can be processed with the image of the user's eye 62 to determine if the user is focusing on a particular portion of the virtual image, such as a particular menu icon or other information.

In an example of the optical system 50 in use, external light from the real world enters through the viewing window 66 and is reflected by the proximal beam-splitting interface 70, through the light pipe 82, and toward the distal beam splitter 80. The distal beam-splitting interface 84 reflects the incident external light to the optical sensor 94 to obtain an image of the real-world environment.

Similarly, light reflected from the user's eye 62 can be directed to the optical sensor 94 to obtain an image of the user's eye. In one example, light from the light source 88, the external light, and/or some other light source is reflected from the user's eye 62 toward the proximal beam splitter 64. The proximal beam-splitting interface 70 reflects the incident reflected light toward the image former 68, which reflects the light back through the proximal beam-splitting interface 70, through the light pipe 82, and toward the distal beam splitter 80. The distal beam-splitting interface 84 reflects the incident reflected light toward the optical sensor 94 to obtain an image of the user's eye 62.

In one example, the light reflected from the user's eye 62 is IR light generated by the light source 88 or some other light source coupled to the optical system 50. In this example, the optical sensor 94 can include an IR filter or otherwise be sensitive to IR light. Thus, the reflected light from the user's eye 62 received by the optical sensor 94 can be distinguished from other light that may be incident on the optical sensor, for example, based on wavelength, which in turn allows the optical system 50 to more accurately track the user's gaze. Alternatively or in conjunction, the light source 88 may emit light that is modulated at predetermined frequencies and/or intensities and reflected from the user's eye 62 to the optical sensor 94 so that reflected modulated light can be distinguished from other non-modulated light incident on the optical sensor.

Various modifications can be made to the optical system 50 of FIG. 2 without departing from the spirit of the present disclosure. For example, the optical system 50 of FIG. 2 may be part of the display system 20 of FIG. 1, so as to be coupled to the processor 32, the data storage 34, the power supply 36, and/or the I/O components 38. Such components 32-38 may be coupled to the display panel 86, the light source 88, and/or the optical sensor 94 in any known manner. In another example, the proximal and/or distal beam-splitting interfaces 70, 84 may be curved to account for a curvature of the reflector 90 and/or a curvature of a lens (not shown) of the optical sensor 94.

Figure 3:
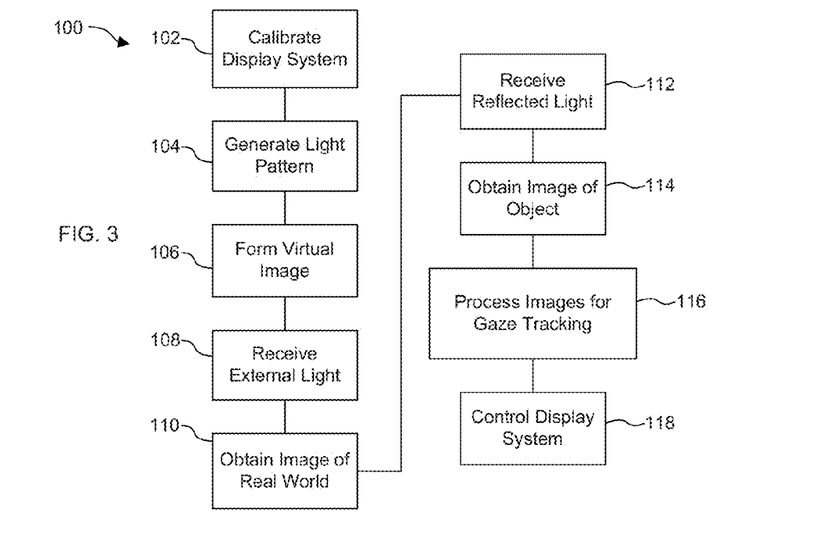
FIG. 3 is a flowchart of processes for obtaining and using gaze tracking information in accordance with an example embodiment.

Referring now to FIG. 3, an example flowchart 100 is illustrated that includes processes for obtaining and using gaze tracking information. The processes of FIG. 3 may be performed by utilizing various hardware and/or software components of the display system 20 of FIG. 1 and the optical system 50 of FIG. 2, for example. In FIG. 3, the flowchart 100 begins at a block 102 during which a calibration process may be performed. In one example, the calibration process includes calibrating an image of the user's eye with an image of the real-world environment and/or with a virtual image for use in the gaze tracking function of the display system. The calibration process in accordance with one non-limiting example includes displaying one or more markers or indicia in the computer generated virtual image overlaid on the user's real-world view. The user is then instructed to direct their gaze or focus on the marker(s), perhaps in a given sequence, while images of the user's eye are obtained. Such images are processed to calibrate the gaze tracking function so that the user's gaze can be accurately tracked and mapped to the real-world view and the virtual image.

Following the block 102, control passes to a block 104, which generates a light pattern from which a virtual image can be formed. Referring to FIG. 2, for example, the light pattern may be generated by the display panel 86 and/or the display panel in combination with the light source 88. Next, control passes to a block 106 and the light pattern is formed into a virtual image viewable by a user, as described above, for example.

At a block 108, external light that represents the real-world environment is received, such as by the optical sensor 94 described above and, at a block 110, the received external light can be processed to obtain an image or other representation of the real world. The representation can include still images and/or video. Similarly, at blocks 112 and 114, light reflected from the object 62, such as the user's eye, at the viewing location 54 can be received by the optical sensor 94 and the received reflected light can be processed to obtain an image or other representation of the user's eye.

At a block 116, the image of the user's eye is processed with the image of the real world and/or the virtual image to track the user's gaze. In one example, the image of the user's eye is processed to extract one or more features of the eye, such as an eye pupil centroid, an eye pupil diameter, an eye pupil periphery, etc. A gaze direction can be determined from the extracted feature(s) and the gaze direction can be correlated to the real-world environment and/or the virtual image.

Thereafter, control passes to a block 118, and the display system can be controlled in response to the gaze tracking. In one example, the block 118 may control the display system by updating or modifying the virtual image to relate to a feature in the real-world view or to some indicia in the virtual image. In another example, the block 118 may control other components of the display system in response to the gaze tracking, such as by playing an audio message through a speaker or initiating a phone call.

Various modifications can be made to the flowchart 100 of FIG. 3, for example, additional or fewer process blocks can be utilized and arranged in any appropriate order or even executed concurrently. For example, the calibration process may be omitted, performed only once by a manufacturer of the display device, or performed multiple times in any order with respect to the other process blocks.

Figure 4:
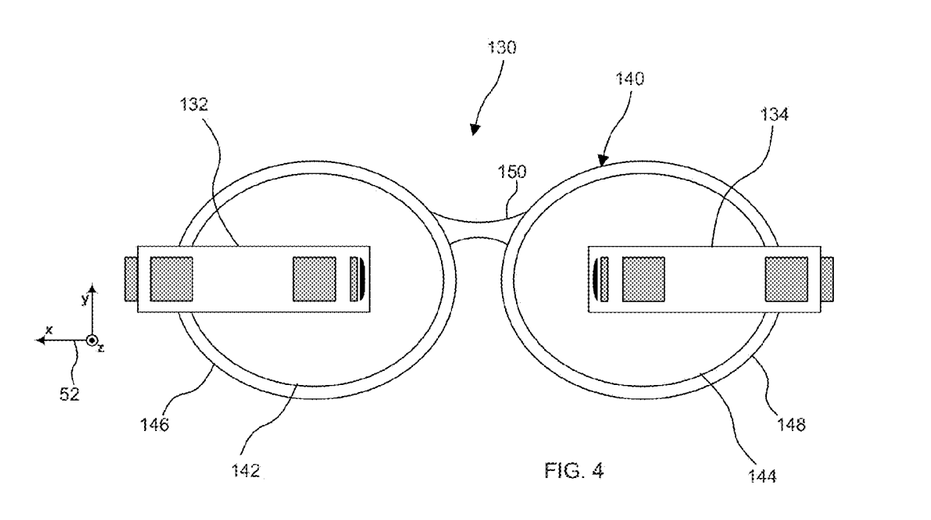
FIG. 4 is a front elevational view of a head-mounted display in accordance with an example embodiment.
Figure 5:
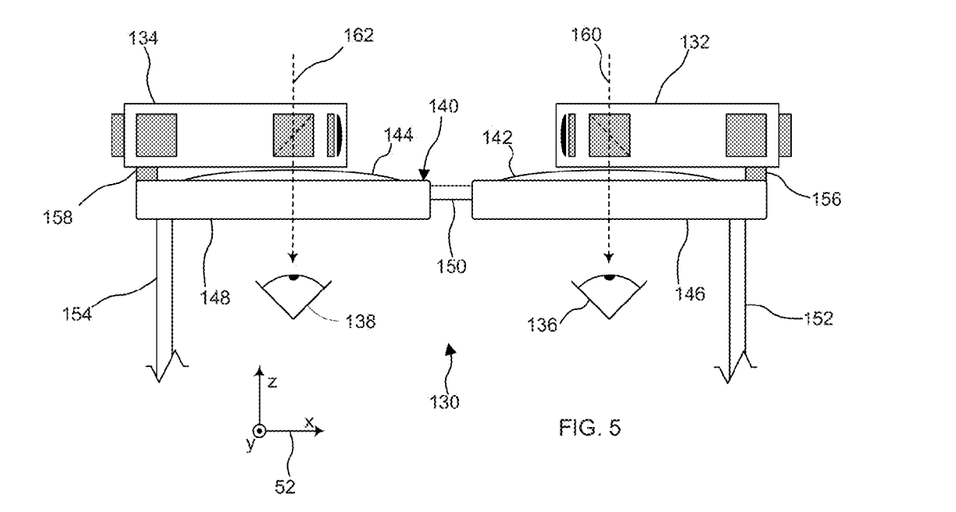
FIG. 5 is a plan view of the head-mounted display of FIG. 4.
Figure 6:
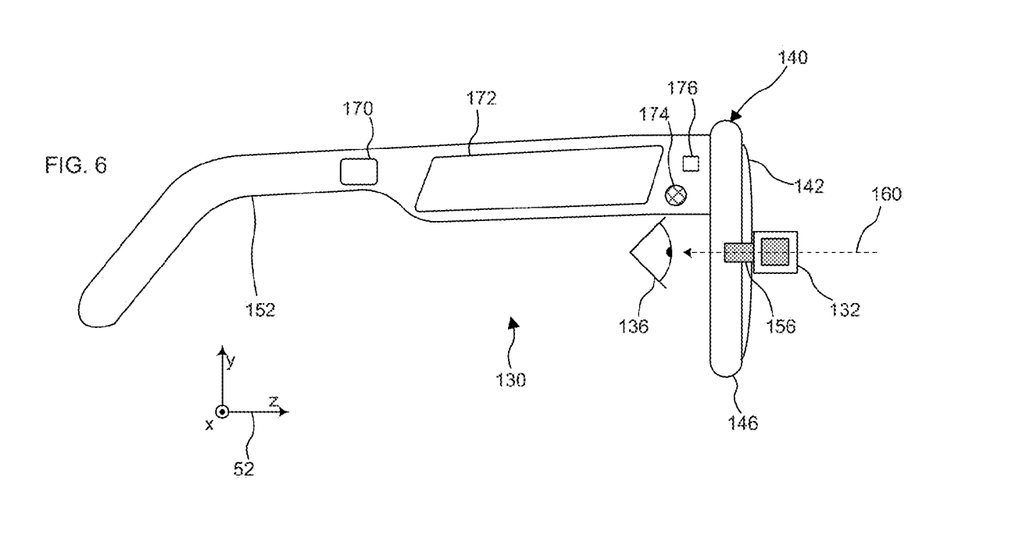
FIG. 6 is a side elevational view of the head-mounted display of FIG. 4.

Referring now to FIGS. 4, 5, and 6, the systems described above for FIGS. 1 and 2 may be attached to a head-mounted support in a position such that the viewing axis is conveniently viewable by either a left or right eye of the wearer or user. In this way, an HMD, through which the outside world is viewable, may be provided. The HMD may also function as a wearable computing device. In FIGS. 4-6, an HMD 130 includes see-through display devices 132 and 134 for the wearer's right eye 136 and left eye 138, respectively. The display devices 132, 134 are attached to a head-mountable support 140. In this example, the head-mountable support 140 is configured in the form of eyeglasses with lenses 142, 144 positioned over the right eye 136 and the left eye 138, respectively. The lenses 142, 144 and are held in place by respective frames 146 and 148. The head-mountable support 140 also includes a bridge piece 150 that is connected to the frames 146, 148 and is configured to be supported by the bridge of the user's nose. In addition, the head-mountable support 140 includes side-pieces 152 and 154 connected to frames 146, 148, respectively, which may hook behind the user's ears.

The right-side display device 132 may be attached to the frame 146 by a mount 156 and the left-side display device 134 may be attached to the frame 148 by a mount 158. The mounts 156, 158 position the display devices 132, 134 so that their respective viewing axes 160, 162 are generally aligned with the user's right eye 136 and left eye 138, respectively. Thus, as shown in FIG. 5, the viewing axis 160 of the right-side display device 132 may extend to the user's right eye 136 through the lens 142 and the viewing axis 162 of the left-side display device 134 may extend to the user's left eye 138 through the lens 144. To achieve this configuration, the mounts 156, 158 can be fixed mounts or they can be adjustable by the user in order to properly and comfortably align the display devices 132, 134.

Although FIGS. 4-6 illustrate the HMD 130 with the display devices 132, 134 separate from the lenses 142, 144 and the frames 146, 148, it should be understood that other configurations are possible. For example, some or all of the components of the display devices 132, 134 can be integrated into the lenses 142, 144 and/or the frames 146, 148. For example, beam splitters and light pipes may be integrated into the lenses 142, 144 and/or display panels may be integrated into the frames 146, 148. In addition, other embodiments may include a display device for only one of the wearer's eyes. In other examples, the HMD 130 may be configured as goggles, a helmet, a head-band, or a hat. Further, instead of a head-mountable support 140, the support mount can be on a usermountable support that can be mounted on the user in other ways, such as on one or both of the user's shoulders or on a backpack being worn by the user.

As noted above, the HMD 130 may function as a wearable computing device. In this regard, the HMD may include a processor 170, which can be located inside of or attached to part of the head-mountable support 140. For example, the processor 170 can be located inside of the side-piece 152, as shown in FIG. 6. However, other configurations are possible.

In one embodiment, the processor 170 is configured to control display panels in the display devices 132, 134 in order to control the virtual images that are generated and displayed to the user. Further, the processor 170 is configured to control optical sensors and to receive images or video captured by the optical sensors. The processor 170 may be communicatively coupled to the display devices 132, 134 by wires inside of the head-mountable support 140, for example. Alternatively, the processor 170 may communicate with the display devices 132, 134 through external wires or through a wireless connection.

The HMD 130 may also include other components that are operatively coupled to the processor 170 to provide desired functionality. For example, the HMD 130 may include one or more touchpads, microphones, and sensors, which are exemplified in FIG. 6 by a touchpad 172, a microphone 174, and a sensor 176 on the side-piece 152. It is to be understood, however, that these components can be located elsewhere in the HMD 130. By appropriate touch interaction with the touchpad 172, the user may control or provide input to the HMD 130. The microphone 174 may be used to receive voice commands from the user and/or to record audio data from the user's surroundings. The sensor 176 may include an accelerometer and/or gyroscope configured to sense movement of the HMD 130. The sensor 176 may also include a global positioning system receiver for determining the location of the HMD. Additionally, the sensor 176 may represent a camera or plurality of cameras that may be configured to observe various fields of view around the HMD 130. The HMD 130 may also include a wired and/or wireless interface through which the processor 170 may exchange data with other computing systems or other devices. In addition to the foregoing, the HMD 130 could also include other types of sensors, user interface components, and/or communication interface components.

The processor 170 may control the content of the virtual images generated by the display systems 132, 134 and in response to various inputs. Such inputs may come from the touchpad 172, the microphone 174, the sensor 176, and/or a wired or wireless communication interfaces of HMD. The processor 170 may also control the content of the virtual images in response to gaze tracking, as described generally above. In this way, the processor 170 may control the content of the virtual images so that it is appropriate for the user's current surroundings and/or tasks in which the user is involved.

The above detailed description describes various features and functions of the disclosed systems, devices, and methods with reference to the accompanying FIGS. In the FIGS., similar symbols typically identify similar components, unless context dictates otherwise. The illustrative embodiments described in the detailed description, FIGS., and claims are not meant to be limiting. Other embodiments can be utilized, and other changes can be made, without departing from the spirit or scope of the subject matter presented herein. It will be readily understood that the aspects of the present disclosure, as generally described herein, and illustrated in the FIGS., can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A display system, comprising:
an image generator configured to generate a virtual image;
a first beam splitter coupled to the image generator, wherein the virtual image and a real-world view are viewable through the first beam splitter from a viewing location;
a second beam splitter coupled to the first beam splitter;
a camera coupled to the second beam splitter, wherein the camera is configured to obtain an image of the viewing location through the first and second beam splitters, and wherein the camera is further configured to obtain an image of the real-world view through the first and second beam splitters; and
a controller coupled to the image generator and the camera and configured to control an operation of the display system based on the image of the viewing location.

2. The display system of claim 1, wherein the camera is configured to image an eye of a user positioned at the viewing location, and wherein the controller is configured to process the image of the eye of the user, to determine a location in at least one of the real-world view and the virtual image where the eye of the user is focused, and to control an operation of the display system in response to the determined location.

3. The display system of claim 2, wherein the controller is configured to determine a location in the real-world view where the eye of the user is focused and to control the generation of the virtual image in response to the determined location.

4. The display system of claim 2, wherein the controller is configured to determine a location in the virtual image where the eye of the user is focused and to control an interaction with a virtual user interface in response to the determined location.

5. The display system of claim 1, further comprising a light source coupled to the second beam splitter, and wherein the image generator includes a display panel coupled to the second beam splitter and a reflector coupled to the first beam splitter.

6. The display system of claim 5, wherein the display panel is configured to spatially modulate light emitted by the light source, and wherein the first and second beam splitters are configured to transmit the spatially modulated light to the reflector, the reflector is configured to reflect the spatially modulated light toward a beam-splitting interface of the first beam splitter, and the beam-splitting interface is configured to reflect the spatially modulated light toward the viewing location as the virtual image.

7. The display system of claim 5, wherein the light source is configured to emit light that is reflected from the viewing location and received by the camera to obtain the image of the viewing location.

8. The display system of claim 5, wherein the first beam splitter is a polarizing beam splitter and the image generator further includes a quarter-wave plate coupled between the reflector and the first beam splitter.

9. The display system of claim 5, wherein the reflector is a curved reflector and the first and second beam splitters include first and second beam-splitting interfaces, respectively, and wherein at least one of the first and second beam-splitting interfaces is a curved interface.

10. The display system of claim 1, wherein the camera is disposed at a distal surface of the second beam splitter and an image sensing portion of the camera is directed toward the second beam splitter.

11. The display system of claim 1, wherein at least one of the first and second beam splitters is a polarizing beam splitter.

12. The display system of claim 1, further comprising a light pipe coupled between the first and second beam splitters.

13. A display system, comprising:
a display panel configured to generate a light pattern;
one or more optical components coupled to the display panel, and configured to transmit the light pattern, external light from a real-world environment, and reflected light from a viewing location, wherein the light pattern is viewable from the viewing location through the one or more optical components as a virtual image superimposed over the real-world environment;
an optical sensor coupled to the one or more optical components and configured to receive the external light transmitted by the one or more optical components to obtain an image of the real-world environment and to receive the reflected light transmitted by the one or more optical components to obtain an image of the viewing location; and
a processor coupled to the display panel and the optical sensor and configured to process the image of the real-world environment and the image of the viewing location.

14. The display system of claim 13, wherein the one or more optical components are configured to transmit reflected light from an eye of a user positioned at the viewing location, and wherein the optical sensor is configured to receive the reflected light to obtain an image of the eye of the user.

15. The display system of claim 14, wherein the processor is configured to process the image of the real-world environment and the image of the eye of the user, to track the eye of the user with respect to the real-world environment, and to control the generation of the light pattern in response to the tracking.

16. The display system of claim 14, wherein the processor is configured to track the eye of the user with respect to the virtual image and to control an operation of the display system in response to the tracking.

17. The display system of claim 16, wherein the processor is configured to control an interaction with a virtual user interface of the display system in response to the processing.

18. The display system of claim 16, wherein the processor is configured to control one or more input/output components coupled to the processor in response to the tracking of the eye of the user with respect to the virtual image.

19. The display system of claim 18, wherein the one or more input/output components include at least one of a speaker, a transmitter and receiver for communicating with other devices, and a microphone.

20. A method, comprising:
generating a light pattern using a display panel;
forming a computer generated image from the light pattern utilizing one or more optical components, wherein the computer generated image is viewable from a viewing location;
receiving external light from a real-world environment through the one or more optical components and incident on an optical sensor, wherein the real-world environment is viewable from the viewing location;
obtaining, by the optical sensor, an image of the real-world environment from the received external light;
receiving light reflected from the viewing location through the one or more optical components and incident on the optical sensor;
obtaining, by the optical sensor, an image of the viewing location from the received reflected light; and
controlling the generation of the light pattern based on the image of the viewing location.

21. The method of claim 20, further comprising calibrating the image of the viewing location with at least one of the computer generated image and the image of the real-world environment.

22. The method of claim 20, wherein the optical components include a first beam splitter with a first beam-splitting interface and a second beam splitter with a second beam-splitting interface, wherein the first beam splitter is positioned adjacent the viewing location, and wherein the display panel, the optical sensor, and a light source are coupled to the second beam splitter.

23. The method of claim 22, wherein receiving external light from a real-world environment through the one or more optical components comprises:
reflecting the external light at the first beam-splitting interface toward the second beam splitter and reflecting the external light at the second beam-splitting interface toward the optical sensor.

24. The method of claim 22, wherein the generating and forming comprise:
emitting light from the light source, reflecting the light at the second beam-splitting interface toward the display panel, spatially modulating the light utilizing the display panel, transmitting the spatially modulated light through the first and second beam splitters, reflecting the spatially modulated light utilizing a reflector coupled to the first beam splitter, and reflecting the spatially modulated light at the first beam-splitting interface toward the viewing location.

25. The method of claim 22, wherein receiving light reflected from the viewing location through the one or more optical components comprises:
reflecting light from the view location toward the first beam splitter, reflecting the reflected light at the first beam-splitting interface toward a reflector coupled to the first beam splitter, reflecting the reflected light at the reflector through the first beam splitter toward the second beam splitter, and reflecting the reflected light at the second beam-splitting interface toward the optical sensor.

* * * * *